(12) United States Patent
Scotto

(10) Patent No.: US 6,640,691 B2
(45) Date of Patent: Nov. 4, 2003

(54) CONTINUOUS CASTING LADLE LIFT BEARING SYSTEM

(75) Inventor: Anthony E. Scotto, Pittsburgh, PA (US)

(73) Assignee: SMS Demag, Inc., Pittsburgh, PA (US)

( * ) Notice: Subject to any disclaimer, the term of this patent is extended or adjusted under 35 U.S.C. 154(b) by 0 days.

(21) Appl. No.: 09/881,273

(22) Filed: Jun. 15, 2001

(65) Prior Publication Data

US 2002/0189439 A1 Dec. 19, 2002

(51) Int. Cl.[7] .................................................. F01B 9/00
(52) U.S. Cl. ........................................... 92/140; 403/79
(58) Field of Search .............................. 92/140; 403/26, 403/147, 79

(56) References Cited

U.S. PATENT DOCUMENTS 5,074,698 A * 12/1991 Lippert ........................ 403/79
5,290,156 A * 3/1994 Mayland ..................... 403/147

\* cited by examiner

*Primary Examiner*—Edward K. Look
*Assistant Examiner*—Michael Leslie
(74) *Attorney, Agent, or Firm*—Clifford A. Poff

(57) ABSTRACT

A bearing system for accommodating angular movements occurring during operation of a linear actuator in a lifting structure for a ladle containing liquid steel in a continuous casting installation. Annular bearings on a piston and in an end wall of a piston and cylinder assembly allow free rotation of the piston about a first axis during controlled excursions of translating motion by the piston along the cylinder. A first attachment shaft is joined by cylindrical bearings to the arms of a first clevis for only sliding rotational motion about a second axis. A second attachment shaft secured to a second clevis carries a cylindrical bearing between the clevis arms for only sliding rotational motion about a third axis parallel with the second axis. A saddle is secured to an attachment on the piston rod and having an elongated annular load-bearing surface defining a fourth axis extending along a force transmitting junction with the first attachment shaft. A second pivot block anchored for support by the actuator support base has an elongated annular load-bearing surface defining a fifth axis extending along a force transmitting junction with the cylindrical bearing of the second attachment shaft.

42 Claims, 10 Drawing Sheets

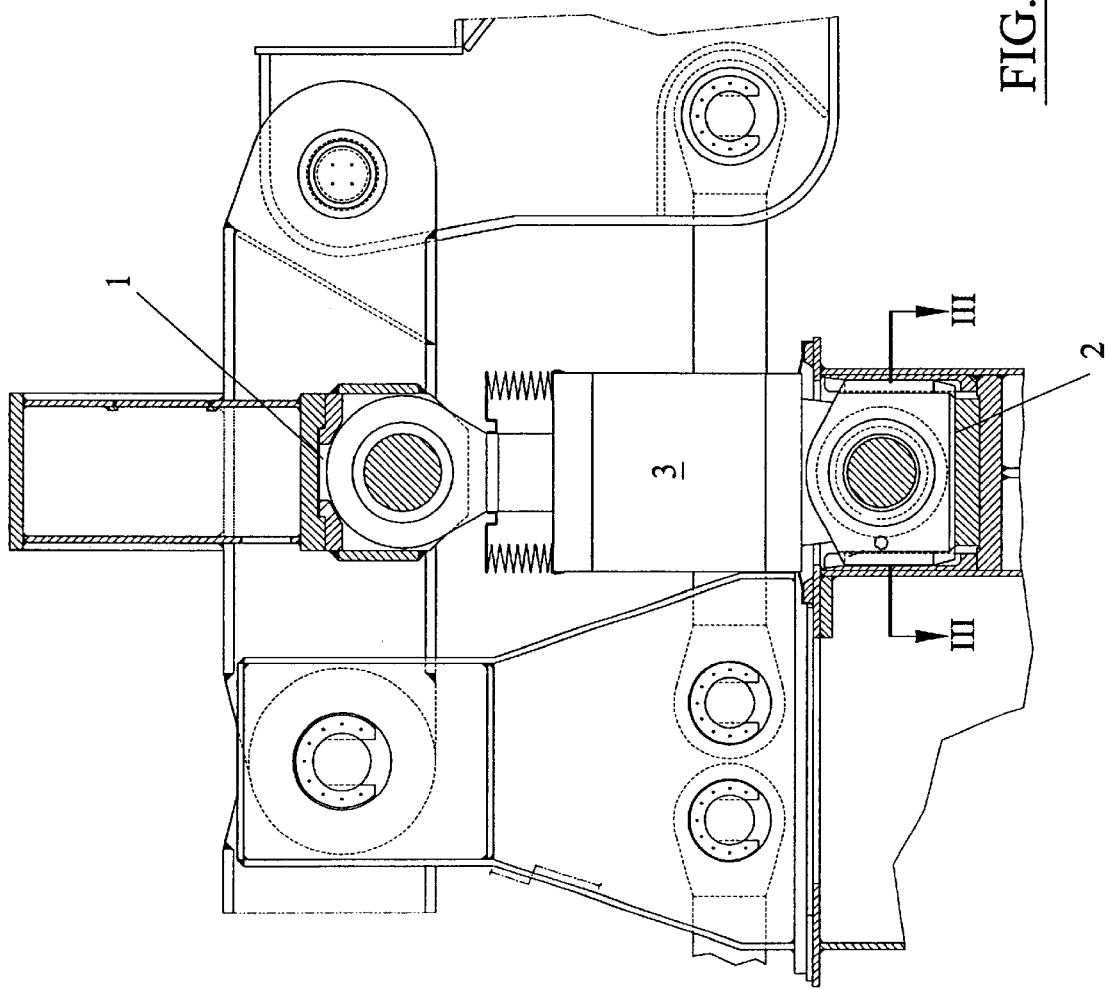
FIG. 1 - PRIOR ART

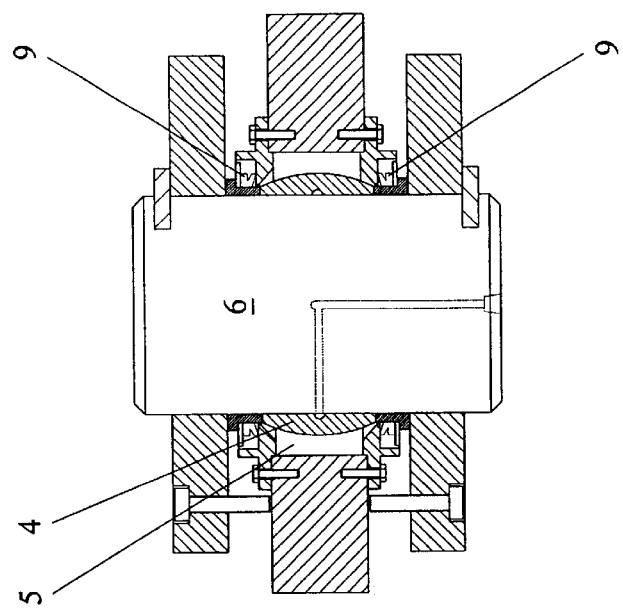
FIG. 3 - PRIOR ART
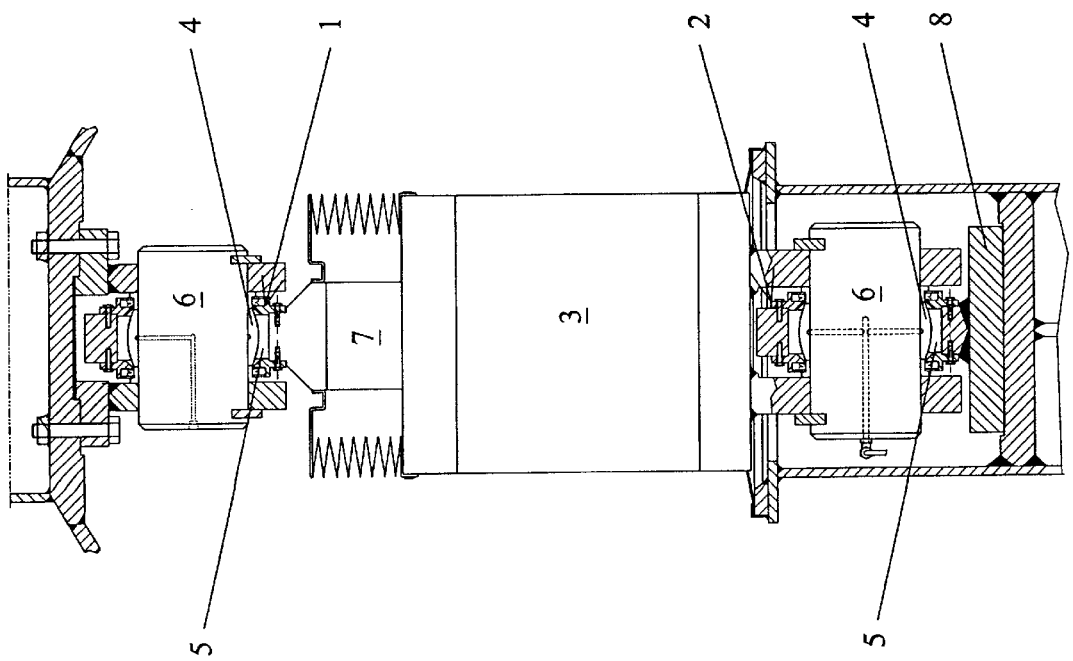
FIG. 2 - PRIOR ART

CONTINUOUS CASTING LADLE LIFT BEARING SYSTEM

CROSS-REFERENCE TO RELATED APPLICATIONS

Not applicable

BACKGROUND OF THE INVENTION

1. Field of the Invention

This invention relates to a bearing system that accommodates angular movements occurring during the operation of a linear actuator, and more particularly to such a bearing system utilizing annular, non-spherical bearing surfaces, allowing motion about three mutually perpendicular axes during the operation of a linear actuator in a lifting structure for a ladle that contains liquid steel in a continuous casting installation.

2. Background of Invention

In the continuous casting of steel, molten steel is transferred to a continuous caster by ladles weighing typically from 200 to 400 tons, which includes the molten steel. The temperature of the molten steel is critical to the casting process, and so it is imperative that a ladle is tapped for the casting process according to a schedule established to prevent the cooling of the molten steel below a desired casting temperature and to avoid the need to return the molten steel to the steel making furnace for reprocessing and the consequential stoppage of the casting process. An unplanned stoppage of the casting process not only results in a consequential production loss but also in additional operating costs to restart the continuous casting process. The complex process of continuous casting begins at the caster, where molten steel flows from a ladle into a tundish, and then into one or more continuous casting molds. Maintaining a steady flow of molten steel into the continuous casting mold is essential, so as not to disturb the delicate balance of cooling, containment of a liquid steel core in the newly formed solid shell, and casting speed required for proper solidification. The volume of liquid in the tundish is selected to maintain an operating level unaffected by minor fluctuations in the liquid flows formed by the floating out of impurities of slag and the flow of molten steel into the mold. Another factor affecting the volume of liquid steel contained in the tundish is the need to accommodate a momentary interruption of the flow of molten steel from one ladle to allow the sequencing of ladles to the caster and reestablish a flow of molten steel from a second ladle.

A typical sequencing of ladles is started by first increasing the flow of molten steel from a first ladle slightly before the ladle is empty to raise the liquid steel level in the tundish slightly above an operating level. When the flow from the ladle changes from molten steel to slag, the slag flow is detected and a slidegate is immediately closed to stop the flow of slag. A pouring tube is disconnected from the ladle nozzle and the ladle is moved away from the casting position. At the same time a second ladle is brought into cast position and a pouring tube is connected to the ladle nozzle of the second ladle whereupon opening of the slidegate initiates the flow of steel into the tundish. The entire sequence, from the stoppage of the flow of molten steel in one ladle to the establishment of a flow of molten steel in a replacement ladle, must be completed before the liquid level in the tundish has been depleted to a certain critical level, below which the quality of the cast steel strand is adversely affected. The sequence of changing the supply of molten steel from one ladle to another is normally accomplished within a very safe time margin. There are instances where reliance on the safe time margin is necessary such as, for example, when the ladle nozzle of the second ladle fails to open due to the freezing of steel in the pouring channel of the ladle exit port. It is a customary practice to use an oxygen lance, which is consumed in the process to remelt the solidified steel in the ladle exit port and start the flow of steel. The pouring channel is sometimes blocked by a large column of solidified steel, in which event it is necessary to raise the ladle to a greater elevation above the tundish to allow greater access to the ladle exit port for the continuous feeding of an elongated oxygen lance which is consumed while remelting the column of solidified steel.

To allow more time for the variable time-consuming use of the oxygen lance, designers have tried to decrease the time needed for other functions such handling of the pouring tube and, in particular, for movement of the ladles. Two typical devices employed in the efficient exchange of ladles are a ladle car and a ladle turret, both of which may employ an actuator for lifting a ladle. A ladle used to supply steel to the tundish of a continuous caster normally has two separate structures for supporting the ladle. The first structure is a pair of trunnions extending from the ladle along a horizontal axis. They are located above the center of gravity of the ladle and are engaged by the J-hooks of a hot-metal crane to transport the ladle to the caster. The second structure is a pair of elongated horizontal seats located below the trunnions. The seats are used for supporting the ladle on a ladle car, ladle turret or stationary stand. The transfer of a ladle from the hot metal crane to a ladle car, ladle turret or stationary stand normally occurs with impact loading on the elements of the support system in the ladle car, ladle turret or stationary stand. A lifting mechanism on the ladle car or turret normally includes means to stabilize the ladle supports and thus also the ladle against tilting during the lifting travel. In addition to sustaining the vertical loading, the lifting mechanism also receives lateral loading due to incidents of positing and negative accelerations due to the movements of the ladle. The vertical and lateral loads on the lifting mechanism produce critical structural deflections that must be considered in the design of the bearing elements of the lifting mechanism.

Electro-mechanical lifting of a ladle on a ladle car, ladle turret or stationary stand has been widely used in the past and provides that each of the two ladle seats is supported on a lifting bridge. The lifting bridges are supported at each end on screw jacks. The four screw jacks are synchronized and driven by universal spindle shafts and gearboxes by one electric motor. The electromechanical lifting system is very reliable for a short lifting distance at a slow speed, but to move a ladle over an extended lifting distance at a faster speed requires heavy-duty ball screw jacks, which are not commercially available. The special nature of the ball screw jacks is very costly in terms of both initial equipment and maintenance. The use of hydraulically powered actuators for lifting a ladle has been employed as a direct replacement of the electromechanical system. The overall structure of the mechanism is very similar and essentially involves replacing each screw jack and associated drive components with a hydraulic cylinder. Synchronization of the four hydraulic cylinders when controlled within the hydraulic system is susceptible to wear of system components and leakage of hydraulic fluid. An improved control system includes the use of an electronic feedback and position controls, but integration of the control system is costly and requires adherence to a strict maintenance schedule.

A third method of lifting a ladle on a car or turret is a combination of hydraulic actuation with mechanical synchronization. This method is chosen for the purpose of illustrating and describing the present invention hereinafter. The mechanical synchronization is accomplished by the use of two parallelogram linkages, one positioned in each of two vertical and parallel planes containing support points for the elongated horizontal seats of the ladle. A rigid frame is used to tie the upper links of the two parallelogram linkages together so that a single hydraulic cylinder positioned near the center of the rigid frame provides the lifting force. One end of each upper link is supported at a stationary point by a bearing on each side of the vertical support structure of the ladle car or turret. The lower link of each parallelogram linkage serves to stabilize and maintain the ladle supports, keeping them horizontal throughout the lifting movement. Hydraulic actuation provides the desired speed without the maintenance problems of electromechanical drives. The single hydraulic actuator is unaffected by wear in the hydraulic system and allows less stringent hydraulic maintenance requirements than in a system with hydraulic synchronization.

The lower end of the hydraulic lifting cylinder is mounted by a bearing on the stationary frame used also to support the lifting linkage. The upper end of the cylinder is attached to the upper link frame by a second bearing. As the cylinder extends upward, the upper link frame rotates counter-clockwise about the bearing on the stationary frame. While the cylinder remains mostly vertical, the rotation of the upper link frame causes a slight pivotal motion of the cylinder about the lower cylinder bearing. The upper cylinder bearing experiences significant rotation approximately equal to that of the upper frame. Attached to the extended ends of the upper links, which lie at opposite sides of the cylinder, are ladle support arms. The arms rise as the upper link frame rotates. The lower links stabilize the ladle support arms, keeping the ladle support surfaces always horizontal as they rise. In a theoretical sense, all of the motion described above occurs in parallel planes, each containing one of the parallelogram linkages. However, due to structural deflections and manufacturing tolerances, there are small components of movement into and out of these theoretical planes, which must be accounted for in the design of the bearings used in this parallelogram linkage. The use of spherical bearings is known in the art to allow rotation about the pivot shaft of the bearing and slight pivotal movement about the axes perpendicular to the shaft.

A spherical bearing is suitable at all pivot positions in the parallelogram linkage except for the bearing needed to join the upper and lower ends of the actuator cylinder to the ladle car or turret and the upper link frame. The bearings for the actuator cylinder are plagued with problems of design, material selection, manufacture, installation, and maintenance. In FIGS. 1–3 there are illustrated typical spherical bearings 1 and 2 at the rod and cylinder ends, respectively, of a piston and cylinder assembly 3. Each bearing 1 and 2 comprises an inner ring 4 and an outer ring 5 formed with mating spherical surfaces used for the transmission of all forces provided by the piston and cylinder assembly 3. The inner ring 4 is free to rotate in all directions about the mating spherical surfaces relative to the outer ring 5. Likewise, if the inner ring is held stationary, the outer ring is free to rotate in a similar fashion. The inner ring of the bearing 1 is mounted in a fixed relation on a pivot a shaft 6, and the outer ring 5 is mounted in a fixed relation in a housing structure 7 on the free end of the piston. The inner ring of the bearing 2 is mounted in a fixed relation on a pivot a shaft 6 and the outer ring 5 is mounted in a fixed relation in housing structure 8 used to secure the cylinder to a support. In their nominal positions, the bores of the housing structures 7 and 8 and the axes of the pivot shafts 6 are parallel and the housing structures may rotate freely about the axes of the shafts and vice-versa. Since the rotating surface is spherical, the axes of the housing bores and the shafts may skew, twist to some degree, which is limited by the proportions of the bearings, the housing structures, and the shafts. The skewing is the result of structural deflections and misalignments between the housing structures and shaft axes, and is normally a very small magnitude as compared with the magnitude of the rotation about the axes. It is relevant to the present invention that all of the motion described above occurs on the same surfaces, namely the spherical surfaces.

Material combinations typically employed in the spherical bearing inner and outer races are steel-on-steel and polytetrafluoroethylene on steel. Since the lifting load is unidirectional, steel-on-steel is difficult to lubricate, and so the self-lubricating polytetrafluoroethylene material is preferred. The polytetrafluoroethylene material performs poorly under impact loading and must be protected from contaminants, including moisture. A typical moisture barrier is an external grease-filled cavity separated from the polytetrafluoroethylene material by a seal identified by reference numeral 9. Grease lubricants and moisture are harmful to the polytetrafluoroethylene material and thus the performance of the seal is very important. However, the use of grease in the seal is necessary to provide a moisture barrier. While the steel-on-steel can withstand extreme impact loads, its poor lubrication results in a low dynamic capacity. With these considerations, for either material a larger bearing must be chosen to suit all requirements. Proper functioning of spherical bearings requires a precise mating of the spherical surfaces between the inner and outer rings 4 and 5. Costly tooling and processes are required to form the spherical surfaces. The spherical bearing is typically installed with an interference fit on the shaft to prevent rotation of the inner ring on the shaft. This requires precise alignment of mating parts and a heavy pressing force on the shaft to avoid consequential damage. Steel-on-steel spherical bearings are susceptible to galling in the presence of even the minutest metallic particles, which may be the product of normal wear and must be completely purged from the bearing by frequent lubrication.

In the application of a typical ladle-lifting cylinder, it is desirable to minimize the overall height of the cylinder assembly. The height of the cylinder affects the surrounding structural frames of the support and lifting systems, which become quite irregular as the height increases. Two areas with opportunities for height reduction are minimizing the outside envelope of the upper and lower bearing assemblies of the lift cylinder.

The objectives of the invention are:
1. To provide a bearing system that allows reliable lifting of ladles with extended maintenance intervals;
2. To allow replacement of individual bearing elements without an extended interruption to the casting process;
3. To provide a bearing system that allows indefinite reconditioning and reuse of structural elements such as shafts;
4. To provide a bearing system that reduces the space requirements for the lift actuator assembly;
5. To simplify the bearing system of the ladle lift mechanism;
6. To relax the manufacturing tolerances of the bearing system and to eliminate complex processes for assembly;

7. To allow manufacture of bearing components with conventional machinery operations such as turning, boring and milling;
8. To separate the functions of the bearing into discrete axes with different designs suited to independent requirements;
9. To allow the use of conventional engineering materials and processes to produce bearing elements;
10. To eliminate the need for complex sealing arrangements and strict protection systems for the bearing elements;
11. To provide a bearing system that reduces the strains on the lift system during sequencing of ladles;
12. To improve stress conditions within the bearing assembly, allowing smaller components and better lubrication;
13. To provide a bearing system that reduces overall cost of the lift system equipment;
14. To provide a bearing system that reduces maintenance costs for the lift system; and
15. To reduce the cost of individual replaceable parts of the bearing elements.

SUMMARY OF THE INVENTION

According to the present invention there is provided the combination of an actuator including an actuator shaft having annular bearing surfaces centered about a first axis for free rotation about the first axis during controlled excursions of translating motion by the actuator shaft along the first axis, and a bearing system comprising: an attachment shaft joined by spaced apart cylindrical surfaces lying at opposite sides of the first axis to a clevis for only sliding rotational motion about a second axis centered along the cylindrical surfaces; and an anchored pivot block with an elongated annular load-bearing surface intercepted by the first axis and joined in a force transmitting relation with the actuator to allow only rolling rotational motion without sliding from a third axis extending along the annular load-bearing surface.

According to a further aspect of the present invention there is also provided the combination of an actuator support base, an actuator including a piston having an annular bearing slidable in an elongated cylinder along a first axis, an actuator shaft extending from the piston along an annular bearing secured to the cylinder for free rotation of the piston and actuator shaft about the first axis during controlled excursions of translating motion by the piston along the cylinder, and a bearing system comprising a first attachment shaft joined by spaced apart cylindrical bearings to spaced apart arms of a first clevis for only sliding rotational motion about a second axis centered along the cylindrical bearings, a second attachment shaft secured to spaced apart arms of a second clevis, a cylindrical bearing mounted on the second attachment shaft between the spaced apart arms of the second clevis for only sliding rotational motion about a third axis centered along the cylindrical bearing and parallel with the second axis, a first pivot block anchored for support by the actuator shaft and having an elongated annular load-bearing surface defining a fourth axis extending along a force transmitting junction with the first attachment shaft, and a second pivot block anchored for support by the actuator support base and having an elongated annular load-bearing surface defining a fifth axis extending along a force transmitting junction with the cylindrical bearing of the second attachment shaft, the fourth axis and the fifth axis being parallel and the elongated annular load-bearing surface of each of the first pivot block and the second pivot block allowing only simultaneous rolling rotational motion without sliding from each of the fourth axis and the fifth axis.

BRIEF DESCRIPTION OF THE SEVERAL VIEWS OF THE DRAWINGS

The present invention will be more fully understood when the following description is read in light of the accompanying drawings in which:

FIG. 1 is an elevational view partly in section of a prior art ladle lift bearing arrangement for a piston and cylinder assembly in a ladle turret;

FIG. 2 is a sectional view taken along lines II—II of FIG. 1;

FIG. 3 is a sectional view taken along lines III—III of FIG. 1;

DETAILED DESCRIPTION OF THE INVENTION

Figure 4:
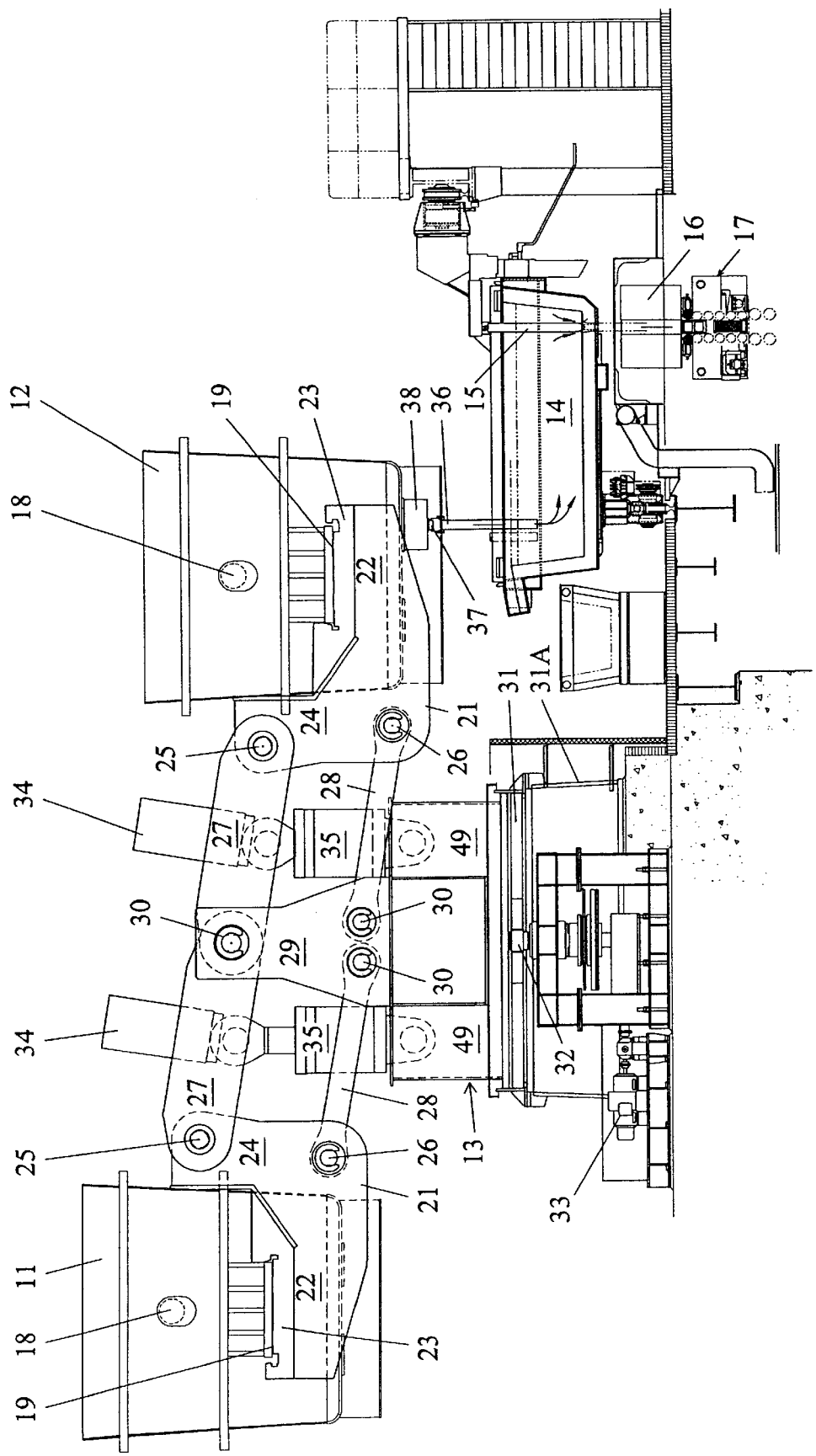
FIG. 4 is an elevational view illustrating a ladle turret incorporating a ladle lift bearing system of the present invention for positioning of a ladle to discharged liquid metal to a tundish of a continuous caster.
Figure 5:
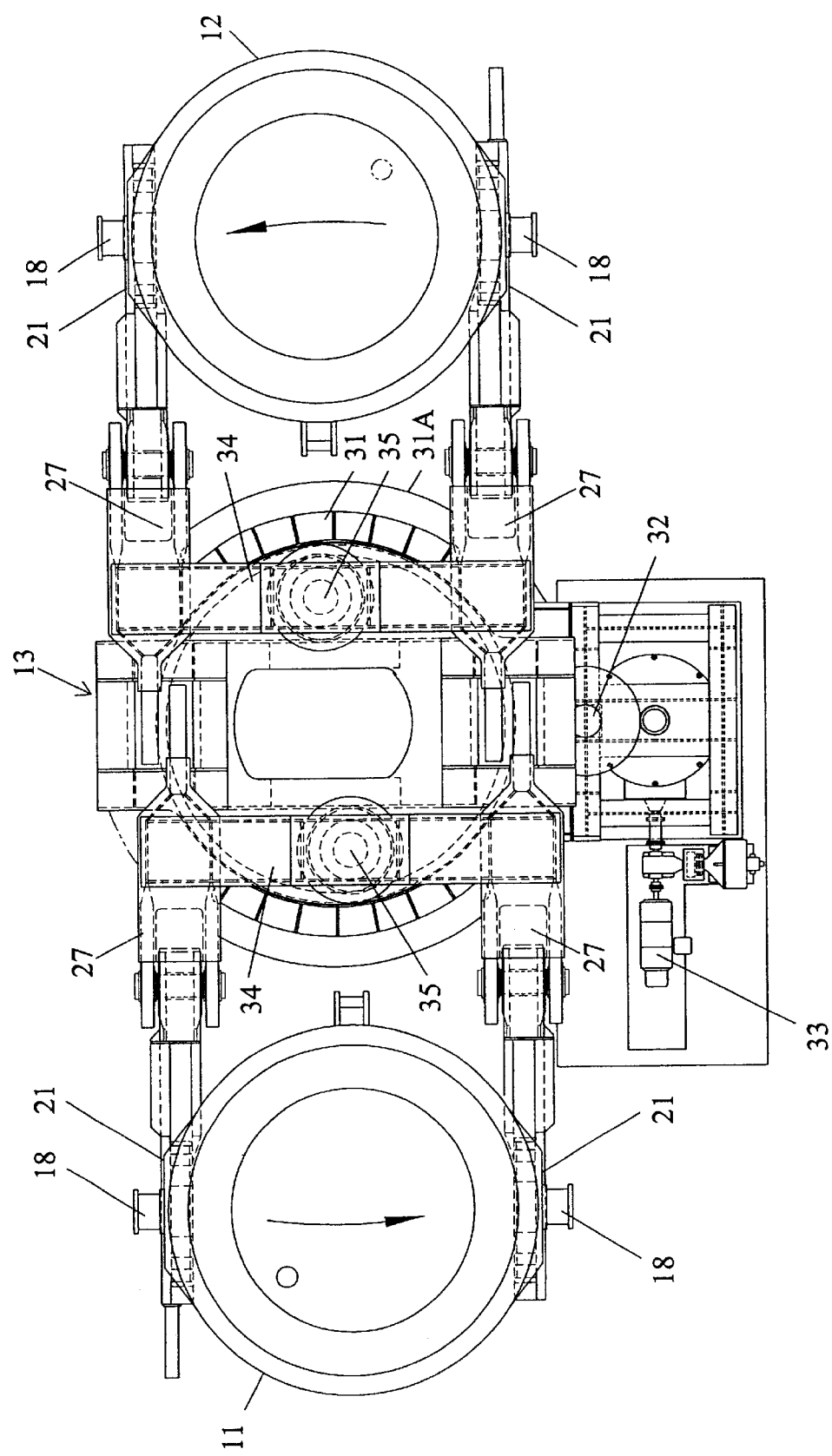
FIG. 5 is a plan view of the ladle turret for the arrangement shown in FIG. 4.

FIGS. 4 and 5 illustrate a ladle turret arrangement for molten steel handling in a continuous casting installation. Molten steel is delivered in ladles 11 and 12 supported by a ladle turret 13 used to rotate the ladles into and from a position directly above a tundish 14. The tundish delivers a stream of liquid steel controlled by a stopper 15 to a mold 16 of a continuous caster 17. Each ladle is provided with a pair of trunnions 18 at diametrically opposite sites lying on a horizontal axis located above the center of gravity of the ladle. The trunnions are engaged by J-hooks, not shown, of a hot metal crane to transport the ladle to and from the ladle turret. Each ladle is also provided with rectangular ladle seats 19 located below the trunnions 18 for supporting the ladle on spaced apart L-shaped support arms 21 forming part of the ladle turret 13. The construction and operation of the ladles, tundish and continuous caster are per se well known in the art. Other forms of ladles, tundish, and continuous casters may be used without departing from the present invention.

The ladle support arms 21 for each ladle have a L-shaped configuration formed by a horizontal leg 22 formed with an elongated recess 23 providing horizontal stop surfaces for positive retention of the ladle seats 19. Movements of the ladle support arms are mechanically synchronized for precise controlled lifting of the ladles by the use of two identical parallelogram linkages for each ladle. As explained here in before, the parallelogram linkages for each ladle are located in parallel vertical planes containing the ladle support arms 21. The L-shaped configuration of each ladle support arm further includes a vertical leg 24 extending upward from the horizontal leg 22 and provided with vertically spaced bores joined by pivot pins 25 and 26 to a lifting arm 27 located above and parallel with a stabilizing arm 28. The free ends of the arms 27 and 28 are joined to a vertical frame 29 by pivot pins 30. The frame 29 is centrally located on a circular plate 31 and rotated on a base 31A provided with gear teeth to mesh with teeth of a drive gear 32 driven by a motor 33. The lifting arm 27 for supporting each ladle is joined by an upper link frame 34 at a location approximately midway between the pivot pins 25 and 30. The upper link frame 34 is lifted vertically by an actuator assembly 35 embodying the features of the present invention for raising and lowering a ladle supported by the associated parallel linkages. It is necessary to raise a ladle to an elevation suitable for installing a pouring tube 36 to a ladle nozzle 37 forming part of a ladle side gate 38 and when necessary to a selected elevation allow the use of an oxygen lance to remelt solidified steel in the ladle exit port. After the pouring tube is installed, the actuator assembly 35 is operated to lower the ladle until the discharge end of the tube is submerged in liquid metal in the tundish 14.

Figure 7:
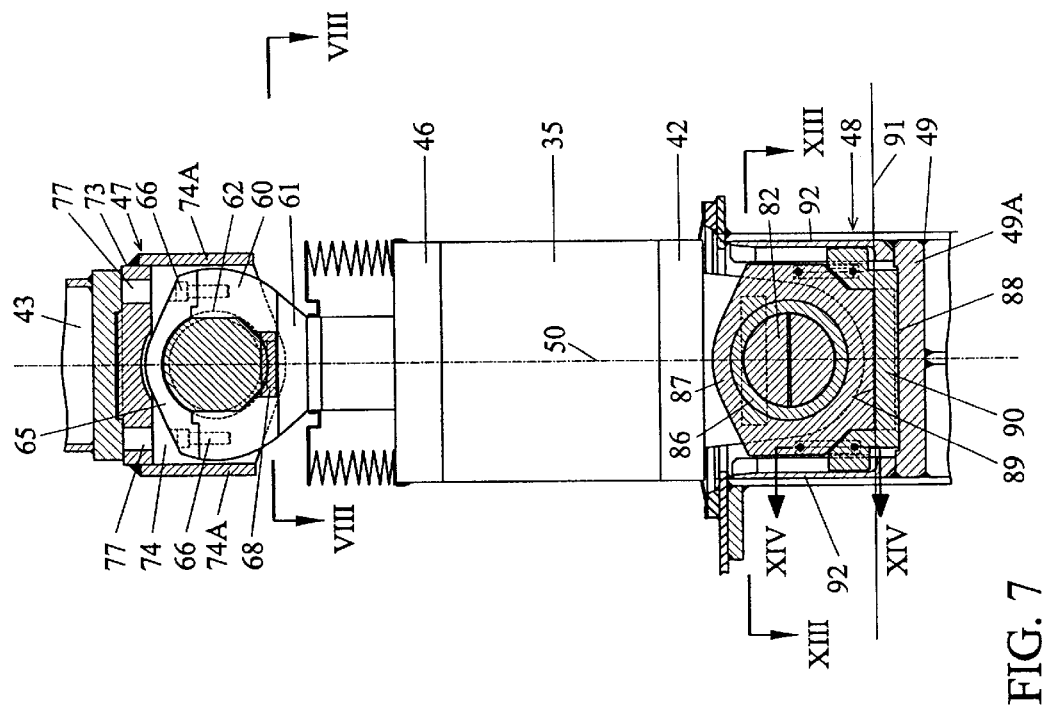
FIG. 7 is a sectional view taken along lines VII—VII of FIG. 6.
Figure 6:
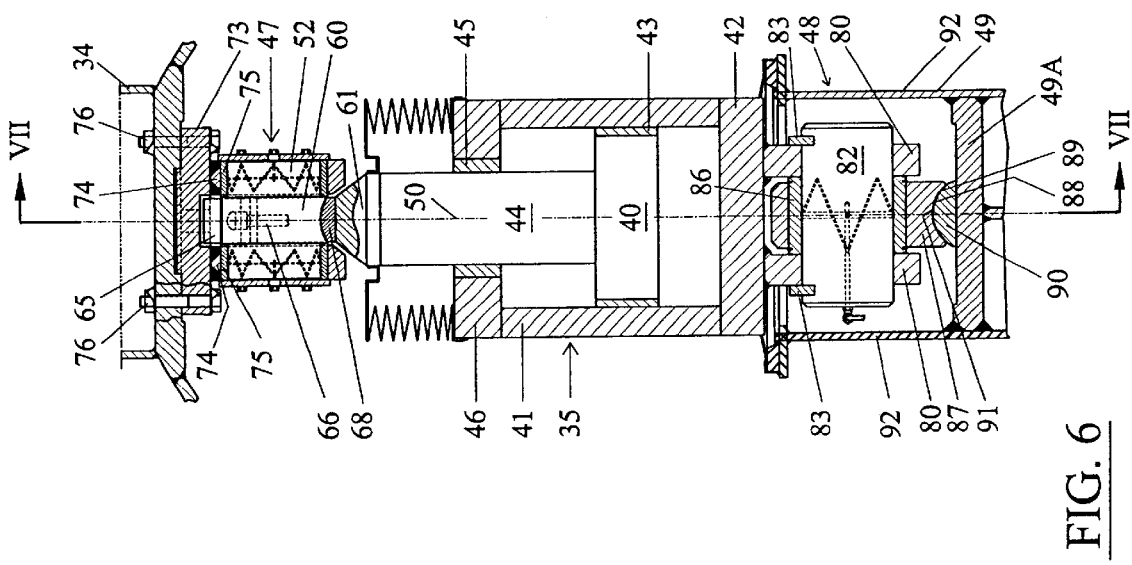
FIG. 6 is a sectional view taken along lines VI—VI of FIG. 4.

FIGS. 6–14 illustrate the construction and arrangement of parts forming each actuator assemblies 35 which as best shown in FIGS. 6 and 7 includes a hydraulically actuated piston and cylinder assembly having a piston 40 slidable along a cylindrical wall of a cylinder 41 for controlled linear excursions in response to a controlled pressurized flow of hydraulic fluid in a cavity between a cylinder end wall 42 and the piston 40. The linear excursions of the piston 40 are guided by a sleeve bearing 43 on the piston for movement along the cylindrical wall of the cylinder 41 and a piston rod 44 joined to the piston is guided by a sleeve bearing 45 mounted in an aperture in an end wall 46 secured to the cylinder 41. The piston rod 44 is mounted by a bearing assembly 47 to the upper link frame 34 and the end wall 42 of the cylinder is mounted by a bearing assembly 48 to a horizontal plate 49A of a pedestal 49 (FIGS. 4, 6 and 7) located on the circular plate 30. The load in the cylinder is unidirectional, with the cylinder always in compression. The controlled linear excursions of the piston 40 and piston rod 44 occur along a first axis 50 extending along the piston rod 44 and the center of the cylindrical wall of the cylinder 41. The piston 40 is free to rotate about axis 50 by sliding motion of bearing 43 on the internal cylindrical wall surface of the cylinder 41 and piston rod 44 is free to rotate about axis 50 by sliding motion of piston rod 44 on the internal cylindrical wall surface of the bearing 45.

Figure 9:
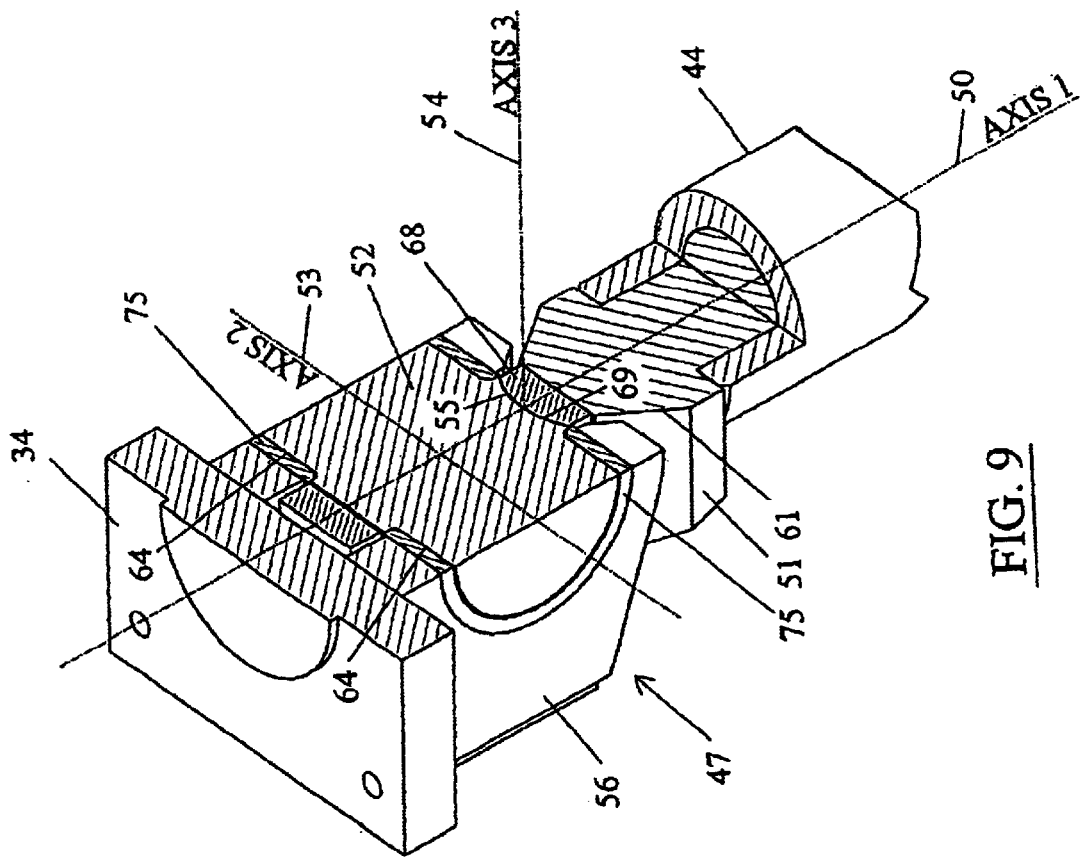
FIG. 9 is an isometric illustration partly in section of an upper bearing assembly for the actuator shown in FIG. 6.

One aspect of the present invention resides in the arrangement of the bearing elements in the bearing assemblies 47 and 48. As shown in FIG. 9, the bearing assembly 47 is mounted on the end of the piston rod 44 extending from the cylinder 41 by a counter bore used to receive a threaded end portion of a rod end attachment 51 which in turn supports an attachment shaft 52 having a central axis defining a second axis 53 which is perpendicular to the first axis 50. A clevis 56 is supported for rotation by an attachment shaft journal at each end of the attachment shaft 52 for connecting the attachment shaft 52 to the upper link frame 34. The clevis is free to rotate with sliding motion relative to the attachment shaft about the second axis 53. Between the attachment shaft 52 and the rod end attachment 51 there is an elongated annular load-bearing surface 55 along which there is defined a third axis 54 extending in a mutually perpendicular relation to axes 50 and 53 when the parts defining these axes are located in their neutral positions with the piston 40 at a start position in the cylinder. The cylindrical support surface 55 allows a slight rolling rotational motion on a concave cylindrical surface 69 formed on the attachment shaft 52 relative to the rod end attachment 51 from the third axis 54. As will be described in greater detail, the attachment shaft 52 is held against rotation by the rod end attachment 51 so that all sliding rotational motion between the attachment shaft 52 and the upper lift frame 34 is forced to occur at the attachment shaft journals. The rolling motion about the third axis will be slight and serves to equalize the load in the journals, thus improving their load carrying capability for a given journal size. The rolling motion is achieved by a slight variation in the curvature of the mating surfaces 55 and 69, the concave radius of 69 being slightly larger. For example, the radius of curvature of the surface 69 must differ and be grater than the radius of curvature of surface 55 by an amount within a range of up to 5% preferably about ½% of the radius of curvature of the mating surface 55.

Figure 8:
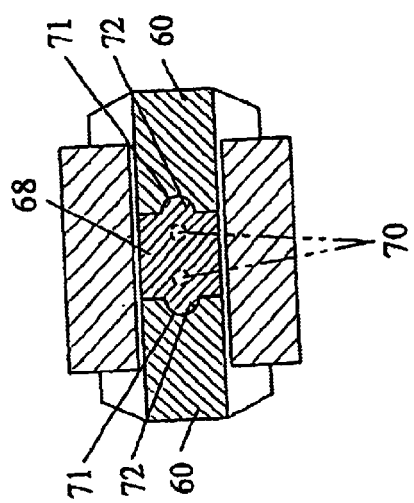
FIG. 8 is a sectional view taken along lines VIII—VIII of FIG. 7.
Figure 11:
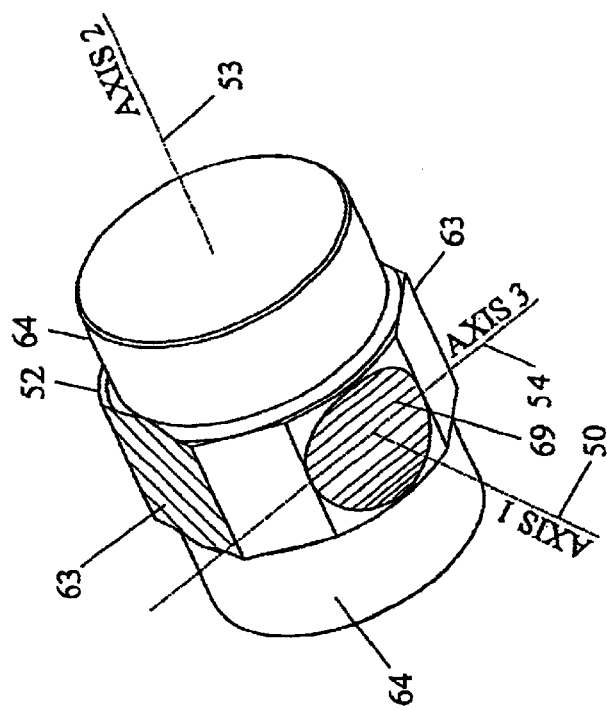
FIG. 11 is an isometric view illustrating of a shaft component of the upper bearing assembly shown in FIG. 9.
Figure 12:
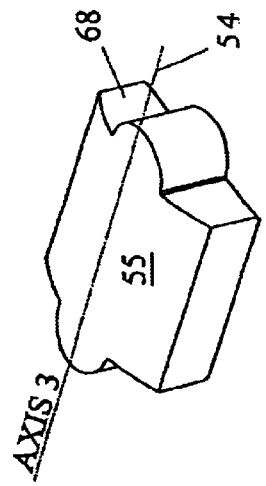
FIG. 12 is an isometric view illustrating of a saddle component of the upper bearing assembly shown in FIG. 9.
Figure 10:
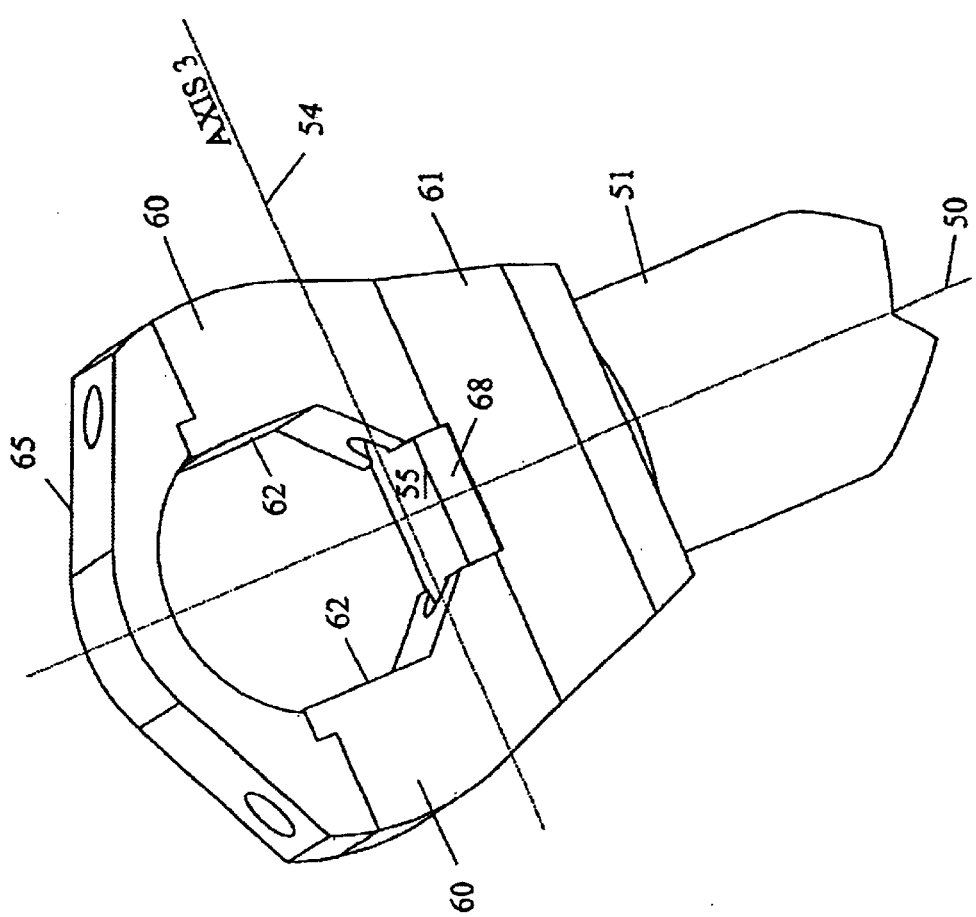
FIG. 10 is an isometric view illustrating a fork component of the upper bearing assembly shown in FIG. 9.
Figure 15:
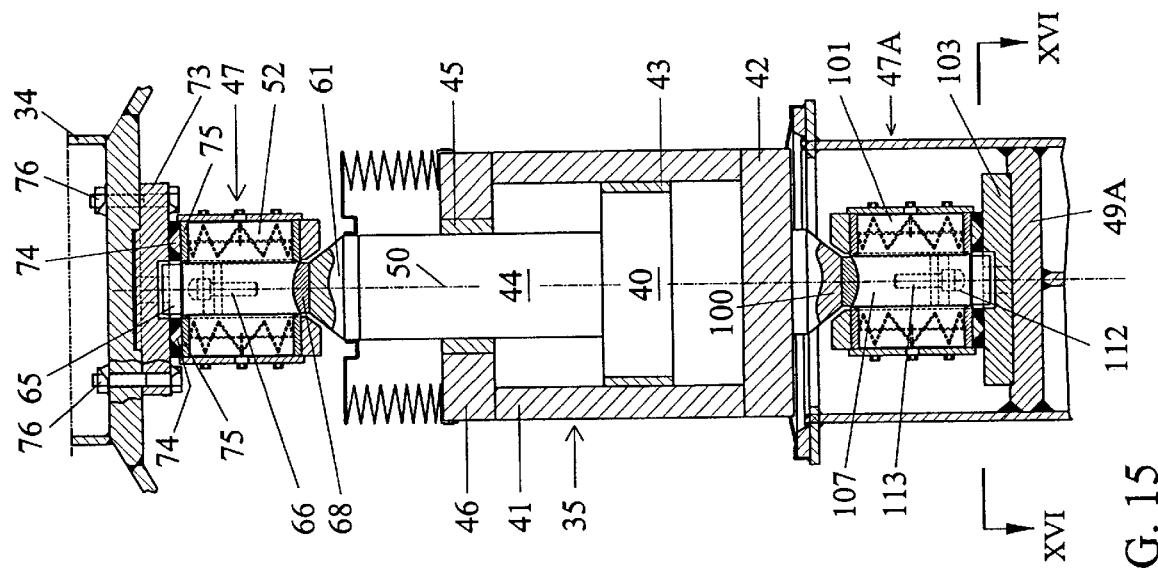
FIG. 15 is a sectional view similar to FIG. 6 and illustrating a second embodiment of the present invention.
Figure 13:
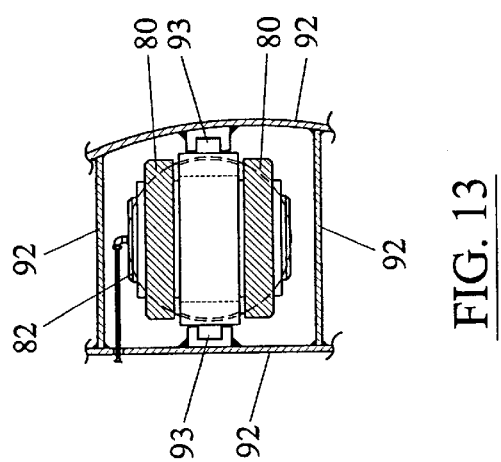
FIG. 13 is a sectional view taken along lines XIII—XIII of FIG. 7.
Figure 14:
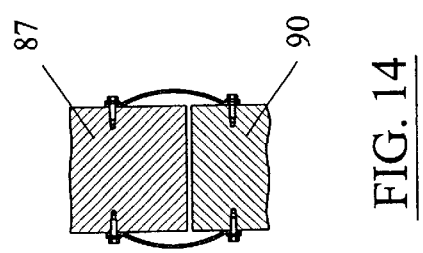
FIG. 14 is a sectional view taken along lines XIV—XIV of FIG. 7.
Figure 17:
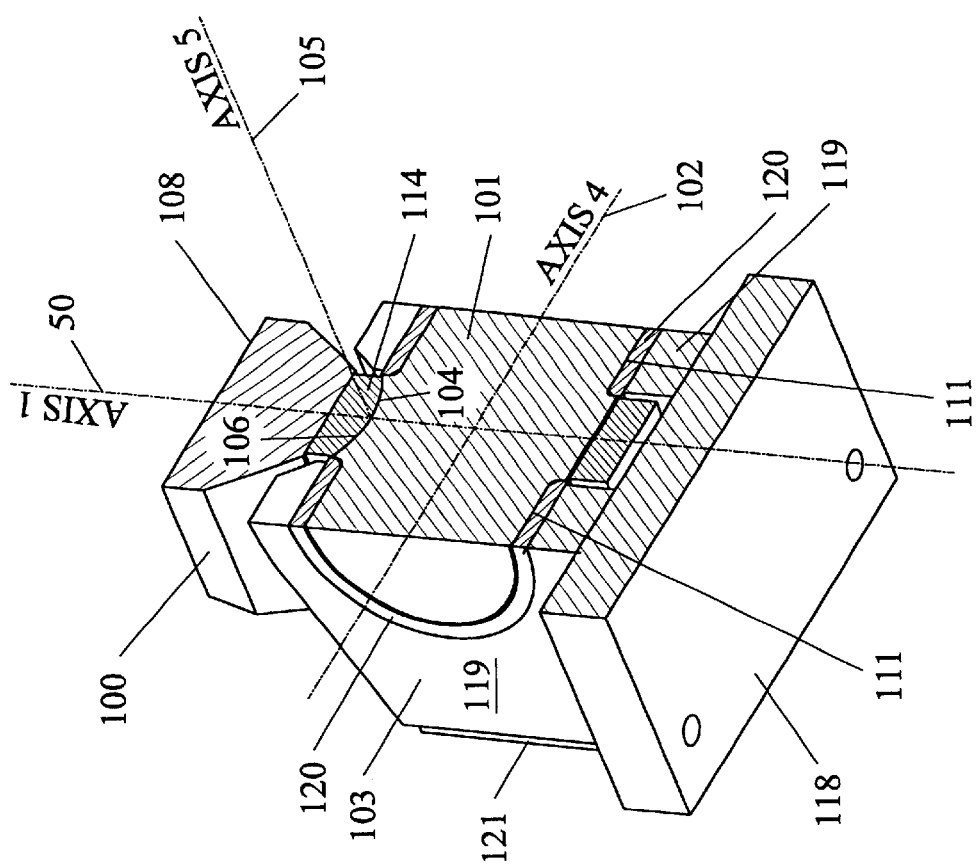
FIG. 17 is an isometric illustration partly in section of an upper bearing assembly for the actuator shown in FIG. 15.

As shown in FIGS. 6, 7 and 10–12, the construction of the rod end attachment 51 provides bifurcated arms 60 upstanding from a crosshead 61. The arms have opposed flat surfaces 62 for engagement with corresponding opposed flat surfaces 63 on the attachment shaft 52 and lying between spaced apart cylindrical bearing journals 64. An end cap 65 is secured by threaded fasteners 66 to the bifurcated arms 60 to maintain opposed flat surfaces of arms engaged with the corresponding opposed flat surfaces on the attachment shaft 53. A metal-to-metal engagement between the opposed flat surfaces 62 and opposed flat surfaces 63 is used to prevent rotation of attachment shaft 52 about the second axis 53. After assembly, the opposed flat surfaces 63 lie in planes perpendicular to the third axis 54 and allow movement of an attachment shaft about the third axis. A pivot block is provided with the elongated annular load-bearing surface 55 constructed on a replaceable hardened saddle 68 seated on the crosshead 61 between the bifurcated arms 60 for engaging in the force transmitting relation at the third axis 56 with an elongated annular load-bearing shaft surface 69 formed on the attachment shaft 52 between the opposed flat surfaces 62. The replaceable hardened saddle 68 is secured against sliding movement on the crosshead by one of two equally suitable structures. In FIG. 8, there is illustrated by phantom lines, the provision of dowel pins 70 located in the central portion of the saddle and extending from socket openings between the saddle and the crosshead. There is also shown in FIG. 8 the alternative construction of forming protruding annular keys 71 at opposed ends of the elongated annular load-bearing surface to engage in key slots 72 formed in the bifurcated arms 60.

As shown in FIGS. 6 and 7, the clevis 56 has the form of an U-shaped bracket comprising a mounting plate 73 secured to spaced apart and parallel bearing support plates 74 formed with aligned apertures dimensioned to supporting cylindrical sleeve bearings 75 for rotatably supporting the journals 64 of the attachment shaft 52. Bridging plates 74A are secured to the spaced apart bearing support plates joined by bridging plates and form reinforcements for minimizing deflections of the attachment shaft and for protectively surrounding the bifurcated arms. Edge portions of mounting plate 73 protrude beyond the bearing support plates 74 and receive releasable threaded fasteners 76 used to secure the clevis 56 to the upper link frame 34. The mounting plate 73 also includes apertures 77 for access to the threaded fasteners 66 for assembly and disassembly of the end cap 65 and the clevis 56 from the attachment shaft 52.

As shown in FIGS. 6, 7, 13 and 14 the bearing assembly 48 is mounted by spaced apart and parallel carrier plates 80 formed with aligned apertures dimensioned to support the end portions of an attachment shaft 82. Keys 83 are received in slots in the attachment shaft and secured to the carrier plates to thereby anchor the attachment shaft to the carrier plates. The carrier plates 80 are secured to the end wall 42 of the cylinder 41 forming a clevis structure. The attachment shaft 82 has a central axis defining a fourth axis 84, which is parallel with the second axis 53 and also perpendicular to the first axis 50. The attachment shaft 82 has a central journal portion for supporting a cylindrical sleeve bearing 86 between the carrier plates 80. A pivot clevis 87 has an annular bore used to mount the pivot clevis on the sleeve bearing 86 for transmitting forces to the attachment shaft 82. The pivot clevis has an elongated annular load-bearing surface 88 in a force transmitting relation with elongated annular load-bearing surface 89 of second pivot block 90 along fifth axis 91 extending in a mutually perpendicular relation to axes 50 and 84 when the parts defining these axes are located in their neutral positions with the piston 40 at a start position in the cylinder. The curvatures of the load-bearing surfaces 88 and 89 differ slightly by an amount sufficient to allow rolling motion between them. For example, the radius of curvature of the surface 88 can differ from the radius of curvature of surface 89 within a range of up to 5% preferably of about ½%. The second pivot block is rigidly secured to the horizontal plate of the pedestal 49. The pedestal 49 is provided with wall sections 92 extending upwardly to the end wall 42 for protectively enclosing the attachment shaft 82. The wall sections 92 are secured to opposed U-shaped support bars that slidably receive mounting ribs 93 and extend upwardly from opposite ends of the elongated annular load-bearing surface 89 of a second pivot block and serve the function of preventing movement of the pivot clevis 87 except to allow a slight pivotal motion about the fifth axis 91. The radius of curvature of each load bearing surface of the pivot blocks 68 and 90 is sufficiently different from the radius of curvature of the mating load-bearing surface to accommodate rolling rotation there between with the magnitude of rotation at the third and fifth axes different, resulting in skewness of the second and fourth axes when the piston rod is extended from the cylinder due to deflections imposed by the weight of the ladle.

All of the bearings surfaces described above are either cylindrical or flat and formed by machining operations using conventional methods of turning, boring or milling. This eliminated the complexities of manufacturing and installing spherical bearings and associated sealing systems, thus simplifying the bearing system. Each of the five separate axes described above is associated with a separate load-bearing surface. This differs from the spherical bearing application in which combined load bearing motions occur on the single spherical surface. The present invention optimizes the particular functions of the bearing assemblies by using separate load-bearing surfaces. The lifting force generated by the piston and cylinder assembly occurs along the first axes with the sleeve bearings 43 and 45 are readily designed for linear sliding movements of the piston 40 in the cylinder 41. Rotational capability of the piston relative to the cylinder is inherent in the cylinder design and is therefore not required as a separate function in the support bearing arrangement. In contrast when the spherical bearing is applied, rotation of the bearing about the cylinder axis must actually be prevented by mechanical stops which are not required in the present invention. Movements about the first and fourth axes in response to the lifting force allow optimizing the design of the cylindrical sleeve bearings 75 and 86 for pure rotational sliding without linear sliding. The small pivotal movements from the third and fifth axes provide misalignment capability with very little movement. This movement is a rolling motion from these axes with little or no forces produced along the second and fourth axes as lateral movement occurs. This greatly reduces the bearing loads within the lift cylinder. Without sliding motion, the surfaces containing the third and fifth axes can be optimized with high surface contact stress and very small area to allow the journals of the attachment shaft 52 to be closer together, thus reducing shaft deflection and improving journal performance which provide increased reliability and extended maintenance intervals.

A normal maintenance routine would involve replacement of the lift cylinder assembly at a predetermined interval and rebuilding of the original lift cylinder assembly in a shop for reuse at a later interval. The interval is determined by internal wear of the lift cylinder based on experience. The replacement process requires an extended down time of the caster. The present invention allows use of a typical weekly outage of one 8-hour shift during which minor maintenance items are addressed for replacement of the upper bearing assembly 47 without removal of the lift cylinder.

The threaded fasteners 66 are accessible through the apertures 76 in the upper bearing housing which allows replacement of the upper bearing assembly without removing the lift cylinder. The bearing housing is detached from the upper link frame, which is then raised upwardly to a remote support site to allow access to the upper bearing. The clevis 56, cylindrical bearings 75 and attachment shaft 52 are removed as an assembly with the end cap 55 trapped inside the clevis. At this time the bifurcated arms 60 are fully exposed and the saddle 68 may be changed if desired. A replacement bearing assembly can be quickly installed onto the bifurcated arms by aligning the end cap with the bifurcated arms as the assembly is lowered and then the fasteners inserted through the apertures into the end cap. The upper linked frame is then lowered and the bearing housing is reattached. Should the attachment shaft 52 suffer undue wear, the surface which mates with the saddle can be reconditioned with no effect to the geometry of the bearing assembly, and the journal surfaces can be ground to a smaller diameter with the replacement cylindrical bearings chosen with a corresponding reduction to the inside diameter. The same condition applies for overcoming damage to the clevis.

The upper and lower bearings of the present invention reduce the loads on the internal cylinder bearings in two ways. First, one component of these loads is due to rotational friction of bearings about the second axis. The load depends on the radius of the sliding surface. In the case of the invention this radius is the radius of the shaft. This radius is minimized through the equalizing feature, which allows the use of smaller journal bearing diameters. The second component of the load is due to pivotal movements about the third and fifth axes. With the bearings of the invention, however, this component is eliminated due to rolling action about the third and fifth axes. The internal loads on the cylinder bearings are therefore greatly reduced which prolongs the service life of the lift cylinder, extending the maintenance interval, and reducing overall maintenance costs.

The bearing assemblies of the invention allow a reduction in overall height of the lift cylinder assembly. The space above the attachment shaft 52 can be very small since it is only necessary to accommodate the end cap. The cylindrical sleeve bearings 75 need be only relatively thin and are located very close to the upper mounting plate of the upper bearing 47. The result is a very compact assembly in terms of height. A similar reduction occurs at the lower bearing 48.

A second embodiment of the present invention is illustrated in FIGS. 15–19 and utilizes substantially the same construction of the bearing assembly 47 at both of the rod end and the cylinder end of the piston and cylinder assembly 35. The bearing assembly 47A at the cylinder end includes an attachment 100 mounted on the end wall 42 of the piston and cylinder assembly 35 and has a central longitudinal axis coaxial with the first axis 50. The attachment 100 supports an attachment shaft 101 having a central axis defining a fourth axis 102 which is parallel with the second axis 53 and perpendicular to the first axis 50. A clevis 103 is seated in a recess formed in the upper surface of the horizontal plate 49A of the pedestal 49. The clevis receives an attachment shaft journal at each end of the attachment shaft 101 for rotation of the attachment shaft, which is secured to the piston and cylinder assembly with sliding motion about the fourth axis 102. Between the attachment shaft 101 and the attachment 100 there is an elongated annular load-bearing surface 104 along which there is defined a fifth axis 105 extending in a mutually perpendicular relation to axes 50 and 102 when the parts defining these axes are located in their neutral positions with the piston 40 at a start position in the cylinder. The fifth axis 105 is spaced from and parallel with the third axis 56 when the parts are in their neutral positions. The cylindrical support surface 104 allows a slight rolling rotational motion on a concave cylindrical surface 106 formed on the attachment shaft 101 relative to the attachment 100 from the fifth axis 105. The rolling motion about the fifth axis will be slight and serves to equalize the load in the journals, thus improving their load carrying capability for a given journal size. The rolling motion is achieved by a slight variation in the curvature of mating surfaces 104 and 106, the concave radius of 106 being slight larger. For example, the radius of curvature of the surface 106 must differ and be greater than the radius of curvature of surface 104 by amount within a range of up to 5% preferably about ½% of the radius of curvature of the mating surface 104.

Figure 16:
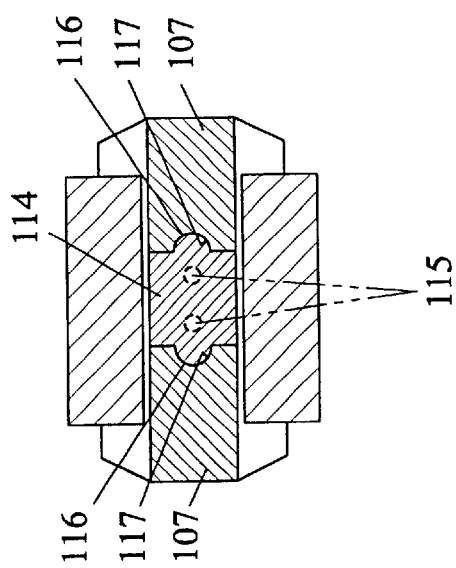
FIG. 16 is a sectional view taken along lines XVI—XVI of FIG. 15.
Figure 19:
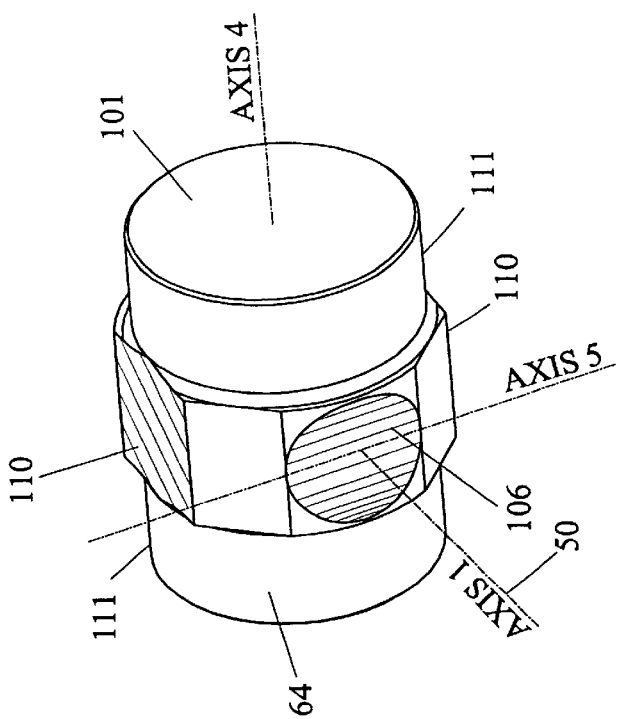
FIG. 19 is an isometric view illustrating of a shaft component of the lower bearing assembly shown in FIG. 15.
Figure 18:
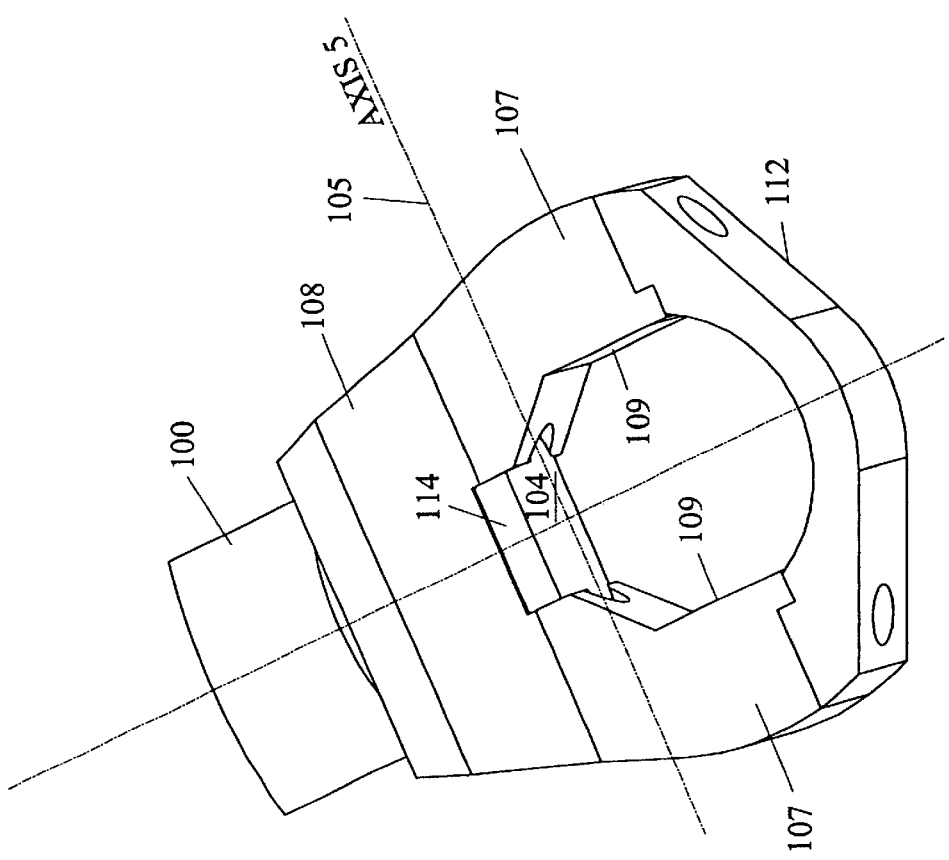
FIG. 18 is an isometric view illustrating a fork component of the lower bearing assembly shown in FIG. 15.

The attachment 100 provides bifurcated arms 107 upstanding from a crosshead 108. The arms have opposed flat surfaces 109 for engagement with corresponding opposed flat surfaces 110 on the attachment shaft 101 and lying between spaced apart cylindrical bearing journals 111. An end cap 112 is secured by threaded fasteners 113 to the bifurcated arms 107 to maintain opposed flat surfaces of arms engaged with the corresponding opposed flat surfaces on the attachment shaft 101. A metal-to-metal engagement between the opposed flat surfaces 109 and opposed flat surfaces 110 is used to prevent rotation of attachment shaft 101 about the fourth axis 102. After assembly, the opposed flat surfaces 110 lie in planes perpendicular to the fifth axis 105 and allow movement of an attachment shaft about the fifth axis. A pivot block is constructed with the elongated annular load-bearing surface 104 in the form of a replaceable hardened saddle 114 seated on the crosshead 108 between the bifurcated arms 107 for engaging in the force transmitting relation at the fifth axis 105 with an elongated annular load bearing shaft surface 106 formed on the attachment shaft 101 between the opposed flat surfaces 110. In the same manner as disclosed for the bearing assembly 47 at the rod end of the actuator, the replaceable hardened saddle 114 is secured against sliding movement on the crosshead by one of two equally suitable structures. In FIG. 16, there is illustrated by phantom lines, the provision of dowel pins 115 located in the central portion of the saddle and extending from socket openings between the saddle and the crosshead. There is also shown in FIG. 16 the alternative construction of forming protruding annular keys 116 at opposed ends of the elongated annular load-bearing surface to engage in key slots 117 formed in the bifurcated arms 107.

The clevis 103 has the form of an U-shaped bracket comprising a mounting plate 118 secured to spaced apart and parallel bearing support plates 119 formed with aligned apertures dimensioned to supporting cylindrical sleeve bearings 120 for rotatably supporting the journals 111 of the attachment shaft 101. Bridging plates 121 are secured to the spaced apart bearing support plates and form reinforcements for minimizing deflections of the attachment shaft and for protectively surrounding the bifurcated arms. Fasteners may secure the mounting plate 118, if desired, to the horizontal plate 49A and in this event access openings can be provided in the pedestal 49 to install and remove the bearing assembly. The use of bearing assemblies having essentially the same construction of parts offer the advantage of reducing the inventory of needed spare parts.

While the present invention has been described in connection with the preferred embodiments of the various Figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. The combination of an actuator including an actuator shaft having annular bearing surfaces centered about a first axis for free rotation about said first axis during controlled excursions of translating motion by said actuator shaft along said first axis, and a bearing system comprising: an attachment shaft joined by spaced apart cylindrical surfaces lying at opposite sides of said first axis to a clevis for only sliding rotational motion about a second axis centered along said cylindrical surfaces; and an anchored pivot block with an elongated annular load-bearing surface intercepted by said first axis and joined in a force transmitting relation with said actuator to allow only rolling rotational motion from a third axis extending along said annular load-bearing surface.

2. The combination according to claim 1 wherein said first axis, said second axis and said third axis are mutually perpendicular at their neutral positions.

3. The combination according to claim 1 wherein said actuator is a linear actuator.

4. The combination according to claim 3 wherein the linear actuator is a hydraulically actuated piston and cylinder assembly.

5. The combination according to claim 3 wherein said second axis and said third axis are mutually perpendicular and extend through/along a portion of along said attachment shaft.

6. The combination according to claim 5 wherein said third axis is perpendicular to said first axis.

7. The combination according to claim 6 further including a connecting rod having bifurcated arms upstanding from a crosshead extending from said actuator shaft, said arms having opposed flat surfaces engaged with corresponding opposed flat surfaces on said attachment shaft for preventing rotation of said attachment shaft about said second axis relative to said actuator; said opposed flat surfaces lying in planes perpendicular to said third axis for allowing movement of said attachment shaft about said third axis.

8. The combination according to claim 7 wherein said attachment shaft includes an elongated annular load-bearing shaft surface between the opposed flat surfaces thereof and wherein said pivot block comprises a replaceable hardened saddle seated on said crosshead between said bifurcated arms with the elongated annular load-bearing saddle surface of said replaceable hardened saddle engaged in the force transmitting relation with said elongated annular load-bearing shaft surface of said attachment shaft.

9. The combination according to claim 8 wherein said elongated annular load-bearing shaft surface is defined by a slightly larger radius of curvature than a radius of curvature that of said elongated annular load-bearing saddle surface for allowing rolling motion of said attachment shaft on said replaceable harden saddle under load, and self-centering of position during assembly without load.

10. The combination according to claim 8 wherein said slightly larger radius of curvature is further defined by an amount of up to 5%.

11. The combination according to claim 8 wherein said slightly larger radius of curvature is further defined by an amount of ½%.

12. The combination according to claim 8 wherein said cylindrical surfaces of said attachment shaft comprise journal surfaces joined by cylindrical sleeve bearings to said clevis.

13. The combination according to claim 12 further including an end cap secured by fasteners to said bifurcated arms to maintain engagement between said opposed flat surfaces of said arms with the corresponding opposed flat surfaces on said attachment shaft.

14. The combination according to claim 13 wherein said clevis comprises spaced apart bearing support plates joined by bridging plates for minimizing deflections of said attachment shaft and for protectively surrounding said bifurcated arms, and wherein said clevis includes apertures for access to said fasteners for disassembly of said end cap and clevis form said attachment shaft.

15. The combination according to claim 13 further including a rigid housing releasably secured to said clevis, and wherein said clevis includes apertures for access to said fasteners for disassembly of said end cap, clevis and said attachment shaft from said bifurcated arms.

16. The combination according to claim 8 further including dowel pins for securing said replaceable hardened saddle against sliding movement on said crosshead.

17. The combination according to claim 8 wherein said replaceable hardened saddle includes keys at opposed ends of the elongated annular load-bearing surface thereof fitted into key slots in said bifurcated arms.

18. The combination of:
an actuator support base;
an actuator including a piston having an annular piston bearing slidable in an elongated cylinder along a first axis, an actuator shaft extending from said piston along an annular cylinder bearing secured to said cylinder for free rotation of said piston and actuator shaft about said first axis during controlled excursions of translating motion by said piston along said cylinder; and a bearing system comprising a first attachment shaft joined by spaced apart cylindrical bearings to spaced apart arms of a first clevis for only sliding rotational motion about a second axis centered along said cylindrical bearings, a first pivot block anchored for support by said actuator shaft and having an elongated annular load-bearing surface defining a third axis extending along a force transmitting junction with said first attachment shaft, a second attachment shaft secured to spaced apart arms of a second clevis, a cylindrical bearing mounted on said second attachment shaft between the spaced apart arms of said second clevis for only sliding rotational motion about a fourth axis centered along said cylindrical bearing and parallel with said second axis, and a second pivot block anchored for support by said actuator support base and having an elongated annular load-bearing surface defining a fifth axis extending along a force transmitting junction with said cylindrical bearing of said second attachment shaft, said third axis and said fifth axis being parallel and the elongated annular load-bearing surface of each of said first pivot block and said second pivot block allowing only simultaneous rolling rotational motion from each of said third axis and said fifth axis.

19. The combination according to claim 18 wherein said first and second pivot blocks have a radius of curvature differing from the radius of curvature of load-bearing surfaces in contact therewith for rolling rotation thereon when the magnitude of rotation at said third and fifth axes differs, resulting in skewness of said second and fourth axes.

20. The combination according to claim 18 wherein said first axis, said second axis and said third axis are mutually perpendicular at their neutral positions.

21. The combination according to claim 18 wherein said linear actuator is hydraulically actuated.

22. The combination according to claim 18 wherein said actuator shaft includes bifurcated arms upstanding from a crosshead, said arms having opposed flat surfaces for engagement with corresponding opposed flat surfaces on said first attachment shaft lying between said spaced apart cylindrical bearings to prevent rotation of said first attachment shaft about said second axis with relation to said actuator, said opposed flat surfaces lying in planes perpendicular to said third axis for allowing movement of said first attachment shaft from said third axis.

23. The combination according to claim 22 wherein said first attachment shaft includes an elongated annular load-bearing shaft surface between said opposed flat surfaces and wherein said first pivot block comprises a replaceable hardened saddle seated on said crosshead between said bifurcated arms with the elongated annular load-bearing surface of said first pivot block engaged in the force transmitting relation with the elongated annular load-bearing shaft surface of said first attachment shaft.

24. The combination according to claim 23 wherein said elongated annular load-bearing shaft surface is defined by a slightly larger radius of curvature than a radius of curvature that of said elongated annular load-bearing saddle surface for allowing rolling motion of said attachment shaft on said replaceable harden saddle under load, and self-centering of position during assembly without load.

25. The combination according to claim 23 wherein said slightly larger radius of curvature is further defined by an amount of up to 5%.

26. The combination according to claim 23 wherein said slightly larger radius of curvature is further defined by an amount of ½%.

27. The combination according to claim 23 wherein said first clevis comprises a clevis bracket having a mounting plate secured to spaced apart and parallel carrier plates formed with aligned apertures containing said cylindrical bearing for rotatably supporting said first attachment shaft, and a load-bearing pivot arm releasably secured to edge portions of said mounting plate protruding beyond said carrier plates.

28. The combination according to claim 27 further including an end cap secured by fasteners to said bifurcated arms to maintain said opposed flat surfaces of said arms engaged with the corresponding opposed flat surfaces on said first attachment shaft.

29. The combination according to claim 28 wherein said mounting plate includes apertures for access to said fasteners for disassembly of said end cap, said first clevis and said first attachment shaft from said bifurcated arms.

30. The combination according to claim 23 further including dowel pins for securing said replaceable saddle against sliding movement on said crosshead.

31. The combination according to claim 30 wherein said replaceable hardened saddle includes keys at opposed ends of the elongated annular load-bearing surface thereof fitted into key slots in said bifurcated arms.

32. The combination according to claim 18 further including a pivot clevis mounted on said second attachment shaft between the spaced apart arms of said second clevis, said pivot clevis having an elongated annular load-bearing surface in a force transmitting relation with said elongated annular load-bearing surface of said second pivot block along said fifth axis, and keys for preventing rotation of said second shaft relative to said second clevis.

33. The combination according to claim 32 wherein said elongated annular load-bearing shaft surface is defined by a slightly larger radius of curvature than a radius of curvature that of said elongated annular load-bearing saddle surface for allowing rolling motion of said attachment shaft on said replaceable harden saddle under load, and self-centering of position during assembly without load.

34. The combination according to claim 33 wherein said slightly larger radius of curvature is further defined by an amount of up to 5%.

35. The combination according to claim 33 wherein said slightly larger radius of curvature is further defined by an amount of ½%.

36. The combination according to claim 32 wherein said second pivot block includes upstanding mounting ribs at opposite ends of the elongated annular load-bearing surface thereof and slidably engaged in vertical slots formed in said actuator support base.

37. The combination according to claim 18 further including a load bearing plate for supporting said second clevis; and attachment extending from end wall of said cylinder, and wherein said attachment includes bifurcated arms upstanding from a crosshead, said arms having opposed flat surfaces for engagement with corresponding opposed flat surfaces on said second attachment shaft lying between said spaced apart cylindrical bearings to prevent rotation of said second attachment shaft about said forth axis, said opposed flat surfaces lying in planes perpendicular to said fifth axis for allowing movement of said second attachment shaft from said third axis.

38. The combination according to claim 37 wherein said second attachment shaft includes an elongated annular load-bearing shaft surface between said opposed flat surfaces and wherein said second pivot block comprises a replaceable hardened saddle seated on said crosshead between said bifurcated arms with the elongated annular load-bearing surface of said second pivot block engaged in the force transmitting relation with the elongated annular load-bearing shaft surface of said second attachment shaft.

39. The combination according to claim 38 wherein said elongated annular load-bearing shaft surface is defined by a slightly larger radius of curvature than a radius of curvature that of said elongated annular load-bearing saddle surface for allowing rolling motion of said attachment shaft on said replaceable harden saddle under load, and self-centering of position during assembly without load.

40. The combination according to claim 38 wherein said slightly larger radius of curvature is further defined by an amount of up to 5%.

41. The combination according to claim 38 wherein said slightly larger radius of curvature is further defined by an amount of ½%.

42. The combination according to claim 38 wherein said second clevis comprises a clevis bracket having a mounting plate secured to spaced apart and parallel carrier plates formed with aligned apertures containing said cylindrical bearing for rotatably supporting said second attachment shaft, and a load-bearing pivot arm releasably secured to edge portions of said mounting plate protruding beyond said carrier plates.

* * * * *